US012312838B2

(12) United States Patent
McGill

(10) Patent No.: US 12,312,838 B2
(45) Date of Patent: May 27, 2025

(54) BOLTING MECHANISM

(71) Applicant: Surelock McGill Limited, Wokingham (GB)

(72) Inventor: John McGill, Wokingham (GB)

(73) Assignee: Surelock McGill Limited, Wokingham (GB)

( * ) Notice: Subject to any disclaimer, the term of this patent is extended or adjusted under 35 U.S.C. 154(b) by 158 days.

(21) Appl. No.: 18/241,507

(22) Filed: Sep. 1, 2023

(65) Prior Publication Data

US 2024/0159083 A1 May 16, 2024

(30) Foreign Application Priority Data

Sep. 6, 2022 (GB) ..................................... 2213003

(51) Int. Cl.

*E05B 63/00* (2006.01)
*E05B 47/00* (2006.01)
*E05B 63/16* (2006.01)

(52) U.S. Cl.

CPC ...... *E05B 63/0069* (2013.01); *E05B 47/0002* (2013.01); *E05B 63/16* (2013.01);
(Continued)

(58) Field of Classification Search

CPC .... E05B 15/004; E05B 47/0002; E05B 47/00; E05B 49/00; E05B 63/0069; E05B 63/16;
(Continued)

(56) References Cited

U.S. PATENT DOCUMENTS 3,791,180 A * 2/1974 Doyle ...................... E05B 59/00 292/34
4,011,741 A * 3/1977 Nolin ...................... E05B 59/00 70/462

(Continued)

FOREIGN PATENT DOCUMENTS

EP 1092827 A2 * 4/2001 ............. E05C 9/041
EP 1462592 A2 * 9/2004 ............. E05B 55/00

(Continued)

*Primary Examiner* — Kristina R Fulton
*Assistant Examiner* — Steven A Tullia
(74) *Attorney, Agent, or Firm* — Michael S. Hargis; Stites & Harbison PLLC

(57) ABSTRACT

A bolting mechanism includes bolt members driven between extended and retracted configurations, a first drive train to couple motion of a handle to the members to drive them between configurations, a primary deadbolt mechanism to prevent the bolt members from being driven between configurations when the mechanism is in a locked state, the mechanism includes a fail-secure actuator that prevents the bolt members from being driven between configurations in case of power loss, a second drive train to couple motion of a second handle to the bolt members to drive them between configurations, the second drive to override the mechanism to drive the bolt members between configurations even when the mechanism is in the locked state, and a secondary deadbolt mechanism arranged to prevent the bolt members from being driven between configurations when the secondary deadbolt mechanism is in a locked state.

20 Claims, 4 Drawing Sheets

(52) U.S. Cl.
CPC . *E05B 2047/002* (2013.01); *E05B 2047/0076* (2013.01); *E05Y 2900/132* (2013.01)

(58) Field of Classification Search
CPC ............. E05B 65/1086; E05B 65/1006; E05B 2047/002; E05B 2047/0076; E05B 2047/0021; E05B 2047/0074; E05B 2047/0077; E05B 2047/0086; E05B 2047/0073; E05B 17/2007; E05C 9/041; E05Y 2900/132
USPC ........................ 70/379 R, 107, 108, 113, 185
See application file for complete search history.

(56) References Cited

U.S. PATENT DOCUMENTS

| | | | | | |
|---|---|---|---|---|---|
| 4,109,494 | A * | 8/1978 | Allemann | E05B 59/00 | 292/38 |
| 4,579,376 | A * | 4/1986 | Charlton | E05B 47/026 | 292/144 |
| 4,593,543 | A * | 6/1986 | Stefanek | E05B 47/026 | 292/144 |
| 5,865,479 | A * | 2/1999 | Viney | E05C 9/041 | 70/DIG. 42 |
| 6,217,087 | B1 * | 4/2001 | Fuller | E05C 9/046 | 70/108 |
| 6,283,516 | B1 * | 9/2001 | Viney | E05B 15/004 | 292/160 |
| 7,698,918 | B2 * | 4/2010 | Geringer | E05B 47/0676 | 70/279.1 |
| 7,856,856 | B2 * | 12/2010 | Shvartz | E05B 63/0056 | 292/172 |
| 7,963,574 | B2 * | 6/2011 | Geringer | E05B 47/0669 | 292/144 |
| 8,550,506 | B2 * | 10/2013 | Nakanishi | E05C 9/04 | 292/DIG. 21 |
| 9,593,516 | B2 * | 3/2017 | Nakanishi | E05B 17/2038 | |
| 9,719,278 | B2 * | 8/2017 | Taylor | E05B 63/0065 | |
| 11,111,698 | B2 * | 9/2021 | Mitchell | E05C 9/025 | |
| 11,905,734 | B2 * | 2/2024 | Davies | E05B 17/2003 | |

FOREIGN PATENT DOCUMENTS

| | | | | |
|---|---|---|---|---|
| EP | 3354825 A2 * | 8/2018 | E05B 17/2007 |
| EP | 3714120 B1 * | 7/2023 | E05B 47/0012 |
| FR | 2788805 A1 * | 7/2000 | E05B 47/0012 |
| GB | 2285280 A * | 7/1995 | E05B 15/024 |
| GB | 2337080 | 11/1999 | |
| GB | 2355282 A * | 4/2001 | E05C 9/041 |
| GB | 2337080 B * | 5/2002 | E05B 15/004 |
| JP | 7025096 B2 * | 2/2022 | E05B 47/00 |
| KR | 20070115914 A * | 12/2007 | E05B 63/0056 |
| WO | WO-2007000763 A1 * | 1/2007 | E05B 63/20 |
| WO | 2010022457 | 3/2010 | |

* cited by examiner

BOLTING MECHANISM

This application claims priority to United Kingdom application number 2213003.3, filed Sep. 6, 2022, the disclosure of which is incorporated herein by reference in its entirety.

The present invention relates to a bolting mechanism, a bolting system comprising such a mechanism, and methods of operating such a mechanism and system. For example, the bolting mechanism be configured for mounting on or in a door or other leaf, and may comprise one or more bolt members arranged to be driven together between an extended configuration securing the door or other leaf within a frame, and a retracted configuration in which the door or leaf may be opened.

INTRODUCTION

It is known to provide a bolting mechanism for mounting on a door or other opening structure, the bolting mechanism being arranged to drive one or more bolts into a surrounding structure such as a door frame to prevent the door from opening. Such a bolting mechanism may be operated by users on either side of the door using suitable handles, but at the same time the bolting mechanism may be controlled electronically to restrict or control access in various ways.

Such access control may involve a user needing to enter a code on a keypad, use swipe card or RFID device, provide a biometric reading such as a fingerprint or retina scan, or complete some other access task, in order for the bolting mechanism to enter an unlocked state in which the user can retract the bolts using the handles. In many situations, it may be desirable to provide restricted access in such ways for users wishing to open the door from outside a space closed by the door, but to permit exit from inside the space without needing to complete any such access task.

In some situations, for example emergency situations, power to the bolting mechanism may be lost. It may then be desirable to ensure that users can still exit the inside space, while preventing unwanted access from the outside.

The invention addresses these and other limitations of the related prior art.

SUMMARY OF THE INVENTION

Generally, according to one aspect, the invention provides a bolting mechanism arranged to permit mechanical egress through a door or other opening structure, using a handle in case of unintentional or accidental electrical power loss to the bolting mechanism. The bolting mechanism comprises a fail-secure electrical actuator arranged to prevent motion of one or more bolts in case of such electrical power loss, a fail-safe electrical actuator arranged to permit motion of the one or more bolts in case of such electrical power loss, and a mechanical override mechanism enabling a user to override the fail-secure electrical actuator, but not the fail safe electrical actuator, by use of a handle, and in particular an inside handle of the door or other opening structure. In an electrically locked state, both actuators prevent motion of the bolts, and in an electrically unlocked state, both actuators permit motion of the bolts.

More particularly, the invention provides a bolting mechanism comprising: one or more bolt members arranged to be driven together between an extended configuration and a retracted configuration; a primary deadbolt mechanism arranged to prevent the bolt members from being driven from the extended to the retracted configuration when the primary deadbolt mechanism is in a locked state, the primary deadbolt mechanism comprising a fail-secure electrical actuator that continues to prevent the bolt members from being driven from the extended to the retracted configuration in case of electrical power loss to the fail-secure electrical actuator or to the bolting mechanism as a whole; and a secondary deadbolt mechanism arranged to prevent the bolt members from being driven from the extended to the retracted configuration when the secondary deadbolt mechanism is in a locked state, the secondary deadbolt mechanism comprising a fail-safe electrical actuator that ceases to prevent the bolt members from being driven from the extended to the retracted configuration in case of electrical power loss to the fail-safe electrical actuator or to the bolting mechanism as a whole.

The bolting mechanism may also comprise: a first drive train arranged to couple operation of a first handle by a user to the bolt members, so as to drive them from the extended to the retracted configuration; and a second drive train arranged to couple operation of a second handle by a user to the bolt members, so as to drive them from the extended to the retracted configuration. The second drive train may then be arranged to override the primary deadbolt mechanism so as to drive the bolt members from the extended to the retracted configuration even when the primary deadbolt mechanism is in the locked state. Note that the first and second drive chains may overlap at least to some extent, for example sharing some common components.

Note that the handles could each take a variety of forms, such as regular lever or knob style door handles, push or panic bars, press pads, and so forth.

The first drive train may be arranged to receive motion from a said first handle disposed on a first side of the bolting mechanism, and the second drive train is arranged may receive motion from a said second handle disposed on a second side of the bolting mechanism opposite to said first side of the bolting mechanism. Typically, these opposite sides are on opposite sides of a plane within which the bolt members extend and retract, or on opposite sides of a leaf such as a door or other opening structure on, at or within which the bolting mechanism is mounted.

The first and second sides may typically be referred to as an "outside" and an "inside". These may indicate separation between the outside and inside of a building, room, or other enclosed space or structure, or may simply designate the two sides of the bolting mechanism which in embodiments of the invention are provided with different access details, for example through the second drive train being arranged to override the primary deadbolt mechanism. In many embodiments, the bolting mechanism is used to control access for people through a door, between an outside of the door and an inside of the door.

In particular, the bolting mechanism may be configured to secure a leaf (such as a door or other opening structure) within a frame to restrict access, especially for people, between an outside space on one side of the leaf and an inside space on the other side of the leaf, the first drive train being arranged to couple motion of a said first (or outside) handle which is disposed in the outside space, the second drive train being arranged to couple motion of a said second (or inside) handle which is disposed in the inside space.

The primary deadbolt mechanism may comprise a first deadbolt arranged to engage at least one of the bolt members, the fail-secure electrical actuator comprising a solenoid arranged to retract the first deadbolt from engagement with the said at least one of the bolt members when powered. The secondary deadbolt mechanism may comprise a second deadbolt arranged to engage with at least one of the bolt members, the fail-safe electrical actuator comprising a solenoid arranged to drive the second deadbolt into engagement with the said at least one of the bolt members when powered.

The primary and secondary deadbolt mechanisms may be arranged to engage different ones of the bolt members, for example with two of the bolt members which are driven in opposite directions to each other between the extended configuration and the retracted configuration.

The second drive train may be arranged to implement a lost-motion mechanism which overrides the primary deadbolt mechanism before driving the bolt members from the extended to the retracted configuration. For example, the lost-motion mechanism may comprise an override member which is arranged to move (in response to operation of the second handle by a user) parallel to the motion of one of the bolt members which is adjacent to the primary deadbolt mechanism, the override member being arranged to urge a deadbolt of the primary deadbolt mechanism (also referred to above as the first deadbolt) to disengage with the said bolt member.

The first and second drive trains may take various forms, and as noted above in coupling motion of each handle to drive the bolt members may overlap or make use of one or more common moving components. However, in some implementations, the first drive train may comprise one or more first rotating gears, and the second drive train may comprises one or more second rotating gears each of which is coaxial with one of the first rotating gears.

The bolting mechanism, and in particular each of the primary and secondary deadbolt mechanisms, may comprise one or more key cylinders with which a physical key can be used to operate or override the deadbolts. For example, the primary deadbolt mechanism may comprise a key cylinder into which a physical key can be inserted from the side of the bolting mechanism of the first handle and used to drive the key cylinder, the primary deadbolt mechanism being arranged such that the driving this key cylinder overrides the fail-secure actuator so as to permit the bolt members to be driven from the extended to the retracted configuration by the first handle, in the event of electrical power loss to the bolting mechanism.

The invention also provides a bolting system comprising the bolting mechanism of any preceding and a controller, the controller being arranged: to maintain the bolting mechanism in a locked state with the bolt members in the extended configuration, by not electrically powering the fail-secure electrical actuator of the primary deadbolt mechanism and electrically powering the fail-safe electrical actuator of the secondary deadbolt mechanism; and to maintain the bolting mechanism in an unlocked state permitting the bolt members to be driven from the extended to the retracted configurations by electrically powering the fail-secure electrical actuator of the primary deadbolt mechanism and not electrically powering the fail-safe electrical actuator of the secondary deadbolt system.

The controller may typically comprise one or more computing or other logic systems, and may receive signals from one or more access control units which may also form part of the bolting system. Such access control units may be disposed adjacent to the inside and outside of a door or other opening structure secured by the bolting mechanism, or in other places, so that users can signal their desire to open the bolting mechanism either from the inside or from the outside.

In particular, the bolting system may be arranged such that, if both the fail-secure electrical actuator of the primary deadbolt mechanism and the fail-safe electrical actuator of the secondary deadbolt system become unpowered, or electrical power more generally is lost to the bolting mechanism or bolting system, operation of the first handle is still blocked from retracting the bolt members by the fail-secure nature of the first electrical actuator, but operation of the second handle is permitted to retract the bolt members by the fail-safe nature of the second electrical actuator.

The invention also provides a leaf within a frame, such as a door, window, or other opening structure, comprising: the above bolting mechanism or system, wherein the leaf is arranged to restrict access between an outside space on one side of the leaf and an inside space on the other side of the leaf; a said first handle disposed in the outside space and coupled to the first drive train; and a said second handle disposed in the inside space and coupled to the second drive train.

The invention also provides a method of controlling a bolting mechanism, or bolting system comprising such a bolting mechanism, such as those described above, comprising: maintaining the bolting mechanism in a locked state (in which the bolt members are typically in the extended configuration), by not electrically powering the fail-secure electrical actuator of the primary deadbolt mechanism and by electrically powering the fail-safe electrical actuator of the secondary deadbolt system; and maintaining the bolting mechanism in an unlocked state (in which the bolt members can typically be driven from the extended to the retracted configuration), by electrically powering the fail-secure electrical actuator of the primary deadbolt mechanism and not electrically powering the fail-safe electrical actuator of the secondary deadbolt system.

The method may further comprise maintaining the bolting mechanism in an unpowered state, for example if electrical power is lost, in which neither the fail-secure electrical actuator of the primary deadbolt mechanism nor the fail-safe electrical actuator of the secondary deadbolt mechanism are powered.

The method may further comprise, when the bolting mechanism is in the locked state or the unpowered state, operating the second handle to override the primary deadbolt mechanism and to drive the bolt members from the extended to the retracted configuration.

The method may further comprise, when the bolting mechanism is in an unpowered state in which neither the fail-secure electrical actuator of the primary deadbolt mechanism nor the fail-safe electrical actuator of the secondary deadbolt system are powered, using a physical key in a key cylinder of the primary deadbolt mechanism to override the fail-secure actuator, and operating the first handle to drive the bolt members from the extended to the retracted configuration.

BRIEF DESCRIPTION OF THE DRAWINGS

Embodiments of the invention will now be described, by way of example only, with reference to the drawings of which.

DETAILED DESCRIPTION OF EMBODIMENTS

Figure 1:
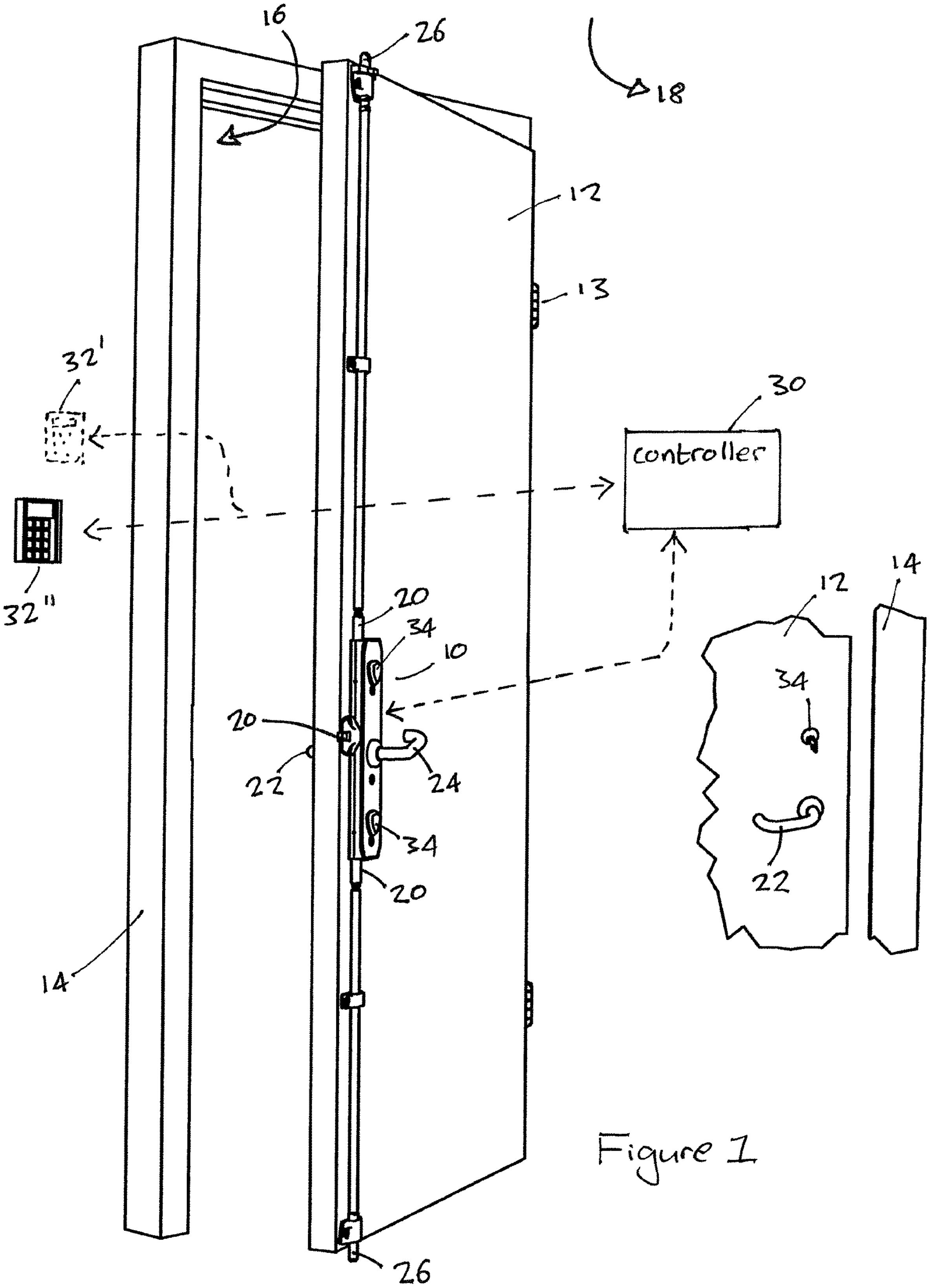
FIG. 1 provides a perspective view of a door on which a bolting mechanism embodying the invention is mounted, so as to permit selective access from the inside and from the outside, with emergency egress from the inside.

FIG. 1 illustrates a bolting mechanism 10 embodying the invention. Although the bolting mechanism may be used for various purposes, in FIG. 1 it is illustrated as being provided to secure a leaf within a frame, in this case a door 12 carried on hinges 13 within a door frame 14. However, embodiments of the invention may equally be applied to doors carried in other ways within a frame, windows, hatches, gates, shutters, and other types of leaf within a frame or other access restricting and opening structures.

The door or other leaf is used to restrict access between an outside space 16 and an inside space 18. These may literally be inside and outside of a room, building or other structure, or may simply define first and second spaces which the door or other leaf is being used to separate. For example, in some embodiments, "inside" may actually be outside of a particular space such as a building, and vice versa. Rather, the terms "inside" and "outside" are used herein to define how the bolting mechanism allows and restricts access between the two spaces.

The bolting mechanism 10 comprises one or more bolt members 20 which are driven together between an extended configuration, in which the bolt members are in extended positions, and a retracted configuration, in which the bolt members are in retracted positions, by a person or user operating a first handle 22 on the outside of the door 12, or a second handle 24 on the inside of the door 12. When the door is closed and the bolt members are in the extended configuration, the bolt members themselves and/or bolts 26 driven directly or indirectly by the bolt members serve to secure the door 12 within the frame 14. When the door is closed and the bolt members are then driven to the retracted configuration the door is released for opening by the user. In FIG. 1 three bolt members/bolts are shown, but one, two, or more than three may be used.

Although conventional lever style rotating door handles are shown in FIG. 1, one or both of the outside and inside handles may be provided using a variety of other styles and mechanisms, for example using push pad or push bar arrangements.

In addition to use of the handles, the bolting mechanism 10 may be automatically controlled by a typically computerized controller 30 or more generally by a control system which may for example include one or more key pads, swipe card readers, RFID tag readers or other types of access control unit 32, typically located within the space outside of the door 12 as shown by control unit 32' in FIG. 1, and within the space inside of the door 12 as shown by control unit 32" in FIG. 1. A person requiring to pass through the door 12 from the outside then operates the access control unit 32', or from the inside then operates the access control unit 32", and the controller 30 then automatically operates the bolting mechanism 10 to permit the bolt members 20 to be retracted by the person operating the respective outside or inside handles 22, 24, if the control system decides that access is to be granted.

The controller 30 may of course deny access if required by not allowing the bolt members to retract, and/or may log access request, denied access, or permitted access by a particular user, entry code or entry device used to operate the access control unit.

In particular, the bolting mechanism 10 comprises deadbolt mechanisms 100, 120 (discussed later) to prevent or permit movement of the bolt members 20 using the handles 22, 24, and in particular to prevent or permit movement of the bolt members from the extended to the retracted configuration, and these deadbolt mechanisms may be automatically controlled by the controller 30 in order to control whether the bolt members can be retracted by operation of the outside or inside handle by a user.

In case of loss of electrical power to the deadbolt mechanisms, or more generally to the bolting mechanism 10, it would be desirable to prevent entrance from the outside through operation of the outside handle 22, but to permit egress from the inside of the door 12, for example in case of emergency exit being needed.

Further access control of the bolting mechanism may be provided by key cylinders 34, located either or both of at the inside and outside of the door 12, using which a person having the correct physical key can override the deadbolt mechanism(s), in particular so as to be able to retract the bolt members irrespective of the locked or unlocked status of the deadbolt mechanisms. AS described below, an outside facing key cylinder of the primary deadbolt mechanism described below can in particular be used to permit entry from the outside of the door 12 when electrical power to the bolting mechanism has failed.

Figure 2:
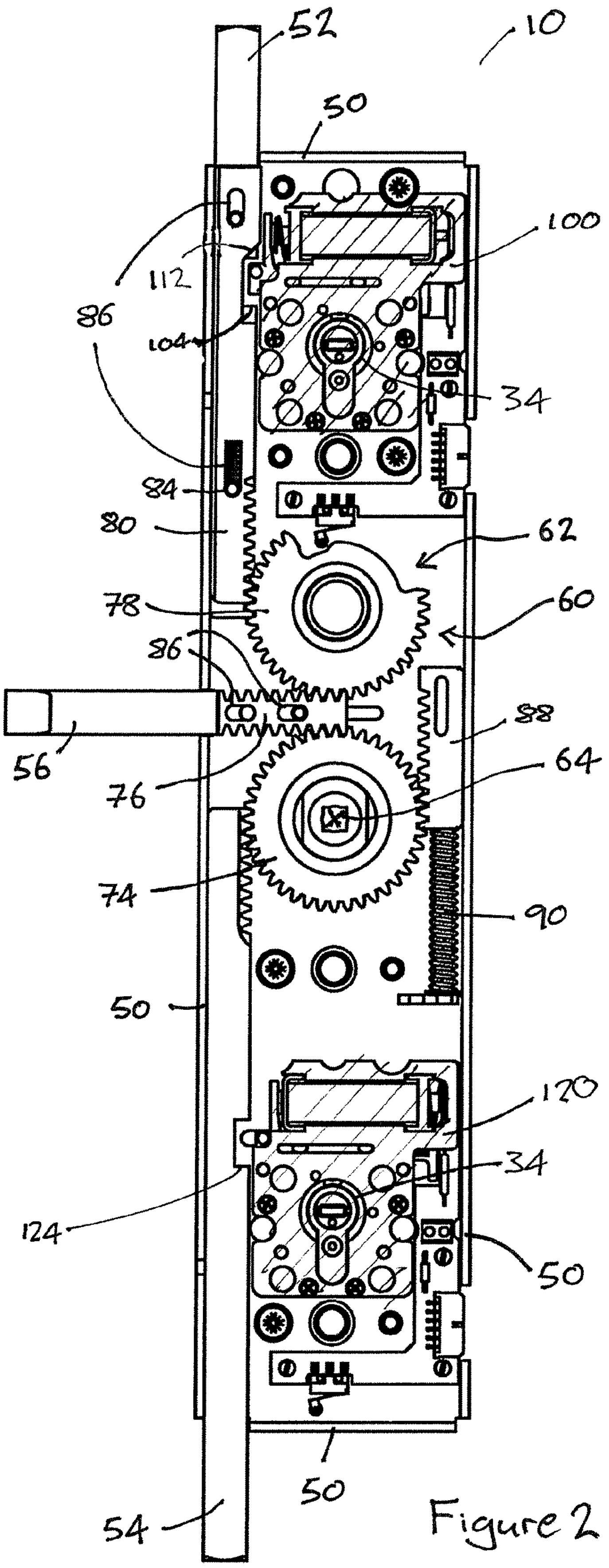
FIG. 2 is a view of the bolting mechanism seen from the inside of FIG. 1, with the inside handle and face of the casing removed.

FIG. 2 provides an internal view of the bolting mechanism 10 of FIG. 1, showing how suitable access control may be provided using primary and secondary deadbolt mechanisms. The bolting mechanism 10 is generally disposed within a casing 50, in this case viewed from inside 18 of the door 12 in the sense shown in FIG. 1. The bolt members 20 of FIG. 1 comprise an upper bolt member 52 arranged to retract downwards into a top of the casing 50, a lower bolt member 54 arranged to retract upwards into a bottom of the casing 50, and a lateral bolt member 56 arranged to retract sideways into a side of the casing 50.

The bolt members may be coupled to motion of an outside handle 22 (located on the far side of the bolting mechanism from the view of FIG. 2) using a first drive train 60 (largely not visible in FIG. 2), and to the motion of an inside handle (24) (located on the near side of the bolting mechanism from the view of FIG. 2) using a second drive train 62 (visible in FIG. 2 and largely overlying the first drive train). In the arrangement of FIG. 2 both the first and second handles (not shown) drive rotation around a handle axis 64.

Figure 3:
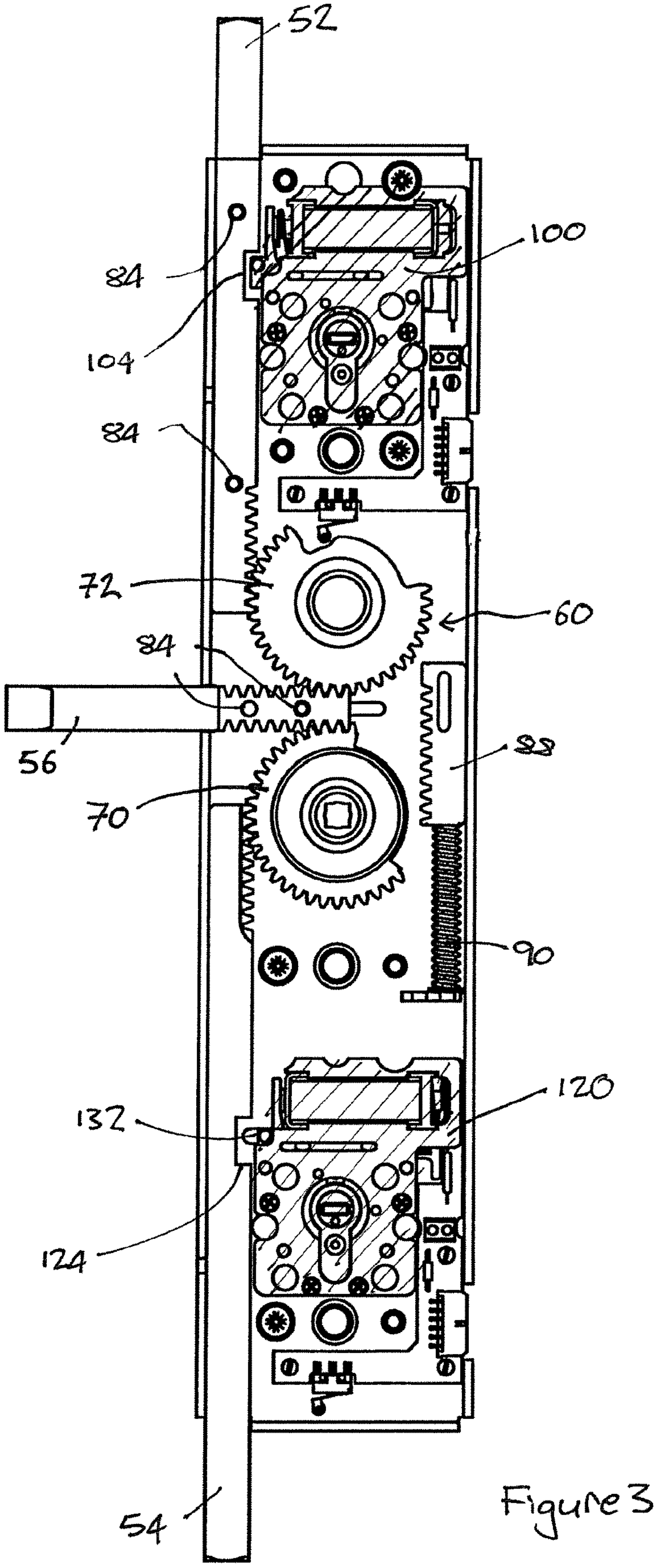
FIG. 3 is the same view as FIG. 2 but with components of the second drive train removed so that the first drive train is more visible.

The drive trains 60, 62 may be implemented in various ways, and may share common components which each other. In FIG. 2 the second drive train 62 can be seen but overlies most of the components of the first drive train which can be better seen in FIG. 3 where overlying components of the second drive train have been removed. Referring therefore first to FIG. 3, the first drive train 60 comprises a first gear 70 which is rotated by operation of the first handle 22, typically connected to the first gear using a short shaft. The first gear 70 meshes directly with gear racks on the lower bolt member 54 and on the lateral bolt member 56 so as to retract or extend these bolt members as the outer handle is operated. Another gear rack on the upper side of the lateral bolt member 54 in turn drives rotation of a second gear 72 which in turn meshes with a gear rack on the upper bolt member 52 to drive retraction and extension of that upper bolt member.

In FIG. 2 it can be seen that the second drive train 62 comprises a third gear 74, overlying and coaxial with the first gear 70, and which is rotated by operation of the second handle 24, typically connected to the third gear by a short shaft. The first and third gears are able to rotate independently, and are separately driven about the handle axis 64 by operation of the first and second handles respectively, although their motions are coupled at least through the lost motion coupling of the second drive train 62 as discussed below.

The third gear 74 does not mesh with the lower bolt member 54 or with the lateral bolt member 56. Instead, it meshes with a lower gear rack of a lateral lost motion member 76 which is adjacent to (and overlies from the perspective of FIG. 2), and slides along, the lateral bolt member 56. An upper gear rack of the lateral lost motion member 76 then meshes with a fourth gear 78 coaxial with (and from the perspective of FIG. 2 overlying) the second gear 72. The fourth gear 78 in turn meshes with a gear rack of an upper lost motion member 80 which slides along (and from the perspective of FIG. 2 overlies) the upper bolt member 52.

On operation of the inner handle 24 to drive retraction of the bolt members through the second drive train 62, the lost motion members 76, 80 initially move for a limited, lost motion, distance without driving the adjacent or underlying bolt members. Once the lost motion distance has been covered, the lost motion members then engage and drive retraction of the adjacent upper and lateral bolt members 52, 56. Motion of the driven upper bolt member 52 then also supports driving retraction of the lateral bolt member 56 through the second gear 72, and motion of the lateral bolt member 56 drives retraction of the lower bolt member 54 through the first gear 70.

The second drive train 62 may therefore also be considered to include at least also the lateral bolt member 56 and the first gear 70 through which motion of the second handle is transferred to the lower bolt member 54, and optionally also the upper bolt member 52 and second gear 72 through which motion of the upper lost motion member 80 may be coupled at least in part to the lateral bolt member 56.

The above lost motion mechanisms may be implemented by providing each of the lateral and upper bolt members with pins 84 which engage within, and slide along, corresponding slots 86 in the adjacent lateral and upper lost motion members 76, 80, or vice versa.

A sprung ancillary member 88 on the opposite side of the casing 50 from the first and second bolt members may be provided, having a geared rack against which the side of the third gear 74 opposite to the lower bolt member 54 bears and meshes, and a compression spring 90 bearing on the ancillary member can thereby be used to urge the second drive train, and therefore also the first drive train towards extension of the bolt members, in opposition to operation of the handles.

Clearly, operation or rotation of the first and second handles may be coupled to drive the bolt members using first and second drive trains having configurations of elements which are different to those described above and shown in FIGS. 2 and 3. For example, if the bolting mechanism comprises just a single bolt member then just two coaxial gears corresponding to the first and third gears described above could be used to drive the single bolt member with a single lost motion member corresponding to the lateral lost motion member discussed above. If a bolting mechanism providing just upper and lower bolt members was required, this could be arranged for example by shortening the lateral bolt member 56 so as not to protrude from the case 50, or omitting altogether the lateral bolt member 56 and lateral lost motion member 76 and instead having the first gear 70 engage directly with the second gear 72, and having the third gear 74 engage directly with the fourth gear 76.

In some embodiments, motorised retraction, and optionally extension, of the bolt members may be provided, typically using an electrical motor acting on one or more parts of the first and second drive trains. This could be achieved by including in the bolting mechanism an electrical motor which acts upon the upper bolt member 52, for example by driving a pinion which engages the gear rack of upper bolt member 52 which can be seen in FIG. 3, or some other gear rack of the upper bolt member 52. Such an electrical motor may typically be arranged to be under control of the controller 30.

As shown in FIGS. 2 and 3, the bolting mechanism comprises a primary deadbolt mechanism 100 (shaded), located towards the top of the case 50, which is arranged to prevent the bolt members from being driven from the extended to the retracted configuration when the primary deadbolt mechanism 100 is in a locked state.

Figure 4:
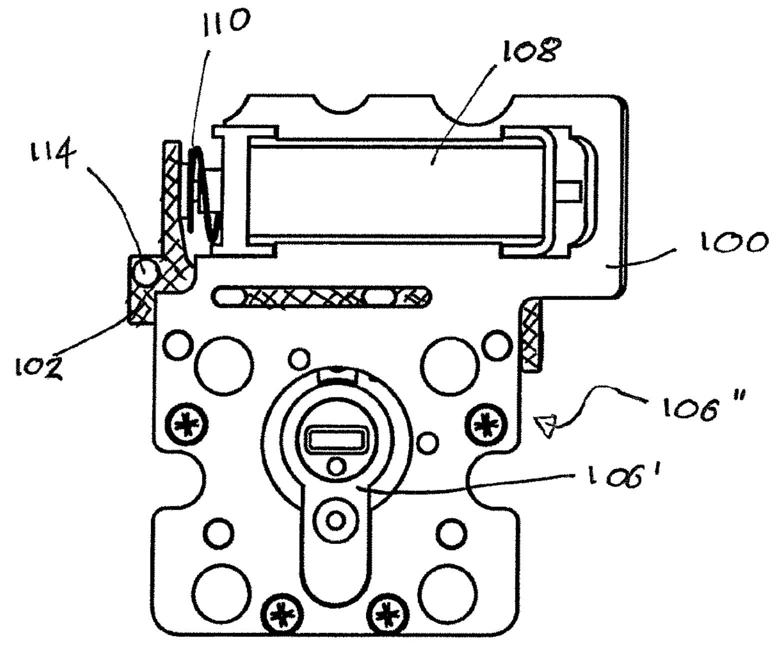
FIGS. 4 and 5 are views of the primary and secondary deadbolt mechanisms seen towards the top and bottom of the casing in FIGS. 2 and 3.

The primary deadbolt mechanism 100 is shown enlarged in FIG. 4, and comprises a first deadbolt 102 (cross hatched) which can slide laterally into or out of engagement with a first recess 104 in the upper bolt member 52. This first recess 104 is best seen in FIG. 3. When located in the first recess 104, the first deadbolt 102 prevents retraction of the upper bolt member 52, and by virtue of the first and/or second drive trains, prevents retraction of all of the other bolt members as well. In FIG. 4 the primary deadbolt mechanism is shown in an electrically locked state, in which the fail-secure electrical actuator is unpowered, and the deadbolt 102 is extending into the first recess 104 (not seen in this figure).

The first deadbolt 102 can be retracted out of engagement with the first recess 104 by operation of a physical key inserted into one of two key cylinders 106', 106" accessible from the inside and outsides of the door 12 respectively. However, the first deadbolt can also be retracted out of engagement with the first recess 104 by action of a fail-secure electrical actuator 108. This electrical actuator 108 is described as fail-secure because in case of electrical power loss to the bolting mechanism 10, or more particularly to the electrical actuator 108, the actuator 108 continues to urge the first deadbolt 102 into engagement with the first recess 104, thereby preventing retraction of the bolt members through operation of the outside, first handle 22, unless overridden by one of the key cylinders 106', 106", or in some other way. This action in case of loss of power may typically be provided by a spring 110 as discussed below.

However, engagement of the first deadbolt 102 with the first recess 104 can still be overridden by operation of the second handle 24 on the inside of the door 12, through action of the second drive train 62, which is arranged to override the primary deadbolt mechanism 100 and first deadbolt 102 so as to permit movement of the bolt members from the extended to the retracted configuration even when the primary deadbolt mechanism 100 is in the locked state in terms of its electrical control.

In the arrangement of FIGS. 2 and 3 this override effect is achieved by action of the upper lost motion member 80 on the first deadbolt 102 during the initial lost motion distance travelled on operation of the inside handle 24. For example as shown in FIG. 2 the upper lost motion member 80 may comprise a linear cam surface 112 which, as the upper lost motion member moves downwards through the lost motion distance, bears obliquely on a pin 114 extending from the first deadbolt, thereby driving the deadbolt out of the first recess 104 against the action of the powered fail-safe electrical actuator 108. Once the first deadbolt has been driven from the first recess 104 the second drive train 62 can continue to retract the bolt members, subject to any other constraints such as those which may be imposed by a secondary deadbolt mechanism discussed in more detail below.

The fail-secure electrical actuator 108 of the primary deadbolt mechanism may be provided by an electrical solenoid which, when powered (unlocked state), urges the first deadbolt 102 out of engagement with the first recess 104 in the upper bolt member, typically against action of a spring 110. When deliberately not powered (locked state), or if electrical power to the bolting mechanism or actuator is unintentionally lost, the spring 110 then urges the first deadbolt into engagement with the first recess 104 thereby preventing retraction of the bolt members unless overridden by one of the key cylinders 106', 106", or by the second drive train 62, and in particular a lost-motion mechanism of the second drive train, as discussed above.

A limitation of the bolting mechanism 10 as so far described is that, although emergency egress without use of a key and without successful operation of an inside access control unit 32" may be needed in the event of electrical power loss, and is enabled by the second drive train 62 as discussed above, it may be desirable to prevent exit from the inside at other times except by successful operation of an inside access control unit 32" or by use of a physical key. If the bolting mechanism of FIGS. 2 and 3 was provided only with the primary deadbolt mechanism 100 of FIG. 4, any person could retract the bolt members by operation of the inside handle 24 and consequent action of the second drive train 62, irrespective of successful operation of the inside access control unit 32" or other permissive status of the control system 30.

The bolting mechanism 10 is therefore also provided with a secondary deadbolt mechanism 120. This secondary deadbolt mechanism 120 is arranged to prevent the bolt members from being driven from the extended to the retracted configuration when the secondary deadbolt mechanism is in a locked state, but comprises a fail-safe electrical actuator 128 that ceases to prevent the bolt members from being driven from the extended to the retracted configuration in case of electrical power loss to the secondary deadbolt mechanism 120 or more generally to the bolting mechanism 10. The term fail-safe therefore indicates that the secondary deadbolt mechanism 120 does not prevent retraction of the bolts, and thereby does permit emergency egress, in the event of electrical power being unintentionally lost to the bolting mechanism or at least to the secondary deadbolt mechanism.

As shown in FIGS. 2 and 3, the secondary deadbolt mechanism 120 may be provided towards the lower end of the case 50, and comprise a second deadbolt 132 arranged to engage within a second recess 124 of the lower bolt member 54 as depicted in FIG. 3 to prevent retraction of the lower bolt member 54 and therefore also retraction of the other bolt members through action of the first and/or second drive trains 60, 62.

Figure 5:
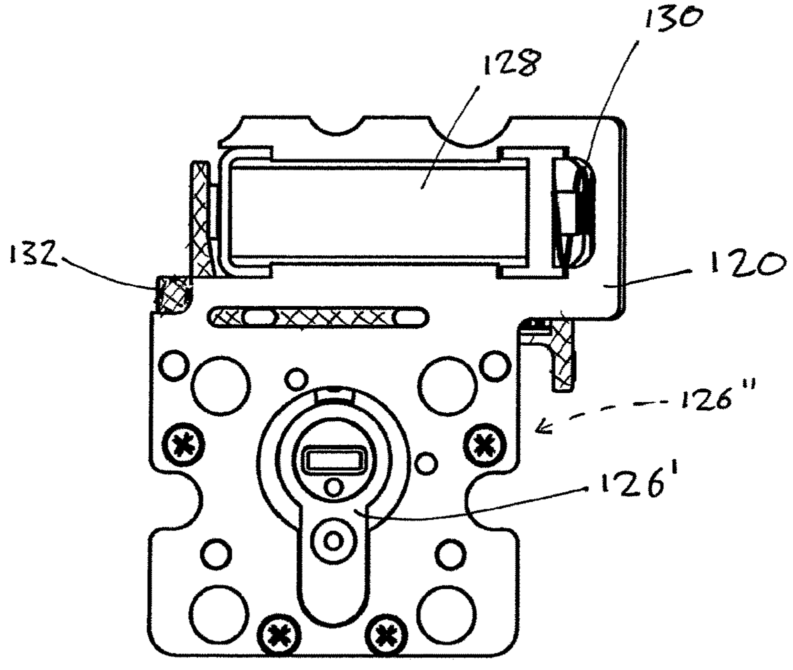

The secondary deadbolt mechanism 120 is shown enlarged in FIG. 5, in which the second deadbolt 132 is shown cross hatched. The fail-safe electrical actuator 128 of the secondary deadbolt mechanism may be provided by an electrical solenoid which, when powered (locked state), urges the second deadbolt 132 into engagement with the second recess 124 in the lower bolt member, typically against action of a spring 130. When deliberately not powered (unlocked state), or if electrical power to the bolting mechanism or actuator is unintentionally lost, the spring 130 then urges the second deadbolt 132 out of engagement with the second recess 124 thereby permitting retraction of the bolt members.

In FIG. 5 the secondary deadbolt mechanism is shown in an electrically unlocked state, in which the fail-safe electrical actuator is unpowered, and the second deadbolt 132 is retracted out of the second recess 124 (not shown in this figure).

The secondary deadbolt mechanism 120 may be provided with a key cylinder 126' arranged to permit a physical key to be inserted from the inside of the door and turned to retract the second deadbolt 132 out of engagement with the lower bolt member 54. A corresponding key cylinder 126" may optionally be provided to permit a physical key to be inserted from the outside of the door for the same purpose. It can be seen from the above discussion that while electrical power to the bolting mechanism 10 is maintained, and the first and second deadbolt mechanisms 100, 120 are in their respective locked states under control of the control system 30, the fail-secure electrical actuator 108 remains unpowered and the first deadbolt 102 remains engaged within the first recess 104 of the upper bolt member preventing bolt retraction, unless overridden by use of one of the key cylinders 106', 106", or by operation of the second, inside handle 24 and corresponding action of the second drive train 62.

However, even if the second, inside handle is used to override the first deadbolt mechanism, the bolt members are prevented from retraction by the engagement of the second deadbolt 132 within the second recess 124 of the lower bolt member 54 because the fail-safe electrical actuator of the second deadbolt 132 remains powered (locked state). The bolts can therefore not be retracted unless the control system 30 is used to set the first and second deadbolt systems to their respective unlocked states in which the fail-secure electrical actuator 108 is powered, the fail-safe electrical actuator 128 is unpowered, and the first and second deadbolts 102, 122 are therefore retracted from the respective recesses in the bolt members, at which time either the inside or outside handles may be used to retract the bolt members.

Should electrical power to the bolting mechanism be lost, the second deadbolt 122 will retract from engagement with the second recess 124 through the fail-safe nature of the second electrical actuator 128 under power loss (for example through action of spring 130 on a solenoid used to implement the actuator). The first deadbolt 102 will remain engaged in the first recess 104 of the upper bolt through the fail-secure nature of the first electrical actuator 108 under power loss, unless overridden either by one of the key cylinders 106', 106" of the primary deadbolt mechanism 100, or unless overridden by the action of the second drive train through operation of the second, inside handle. Emergency egress from the inside without need for any physical key, but not access from the outside, is therefore enabled during power loss to the bolting mechanism 10.

To this end, the controller 30 may be arranged to maintain the bolting mechanism in a locked state, when required, by not electrically powering the fail-secure electrical actuator 108 of the primary deadbolt mechanism 100 and electrically powering the fail-safe electrical actuator 128 of the secondary deadbolt mechanism 120. The controller may then also be arranged to maintain the bolting mechanism in an unlocked state when required, for example for a preset interval after a person has successfully operated an access control unit 32', 32", by electrically powering the fail-secure electrical actuator 108 of the primary deadbolt mechanism 100, and not electrically powering the fail-safe electrical actuator 128 of the secondary deadbolt mechanism 120.

During unintentional electrical power loss to the bolting mechanism 10 the controller 30 (if still powered) effectively loses control of the mechanism, and both electrical actuators are unpowered, so the second deadbolt mechanism ceases to prevent retraction of the bolt members, while the first deadbolt mechanism continues to prevent retraction of the bolt members using the outside handle, but permits retraction of the bolt members using the inside handle.

During unintentional power loss a physical key can also be used in the outside key cylinder 106" of the first deadbolt mechanism 100 to override the fail-secure actuator by retracting the first deadbolt 102 (for example against the action of the spring 110). Since the second deadbolt 132 is already in a retracted state due to the power loss, the bolts can then be driven from the extended to the retracted configuration by use of the outside handle, to thereby permit a user to gain entry from the outside.

Various modifications may be made to the described embodiments without departing from the scope of the invention. For example, an additional motorised or otherwise automated mechanism for driving the bolt members from the extended to the retracted configuration, and optionally also from the retracted to the extended configuration. Although in the figures the upper, lower and lateral bolt members are all of substantially the same width or cross section, this need not be the case. For example, in some implementations the lateral or central bolt member could be wider, thicker, or have a larger cross sectional area.

The invention claimed is:

1. A bolting mechanism comprising:

one or more bolt members arranged to be driven together between an extended configuration and a retracted configuration;

a first drive train arranged to couple motion of a first handle to the bolt members so as to drive them from the extended to the retracted configuration;

a primary deadbolt mechanism arranged to prevent the bolt members from being driven from the extended to the retracted configuration when the primary deadbolt mechanism is in a locked state, the primary deadbolt mechanism comprising a fail-secure electrical actuator that continues to prevent the bolt members from being driven from the extended to the retracted configuration in case of electrical power loss to the bolting mechanism;

a second drive train arranged to couple motion of a second handle to the bolt members to drive them from the extended to the retracted configuration, the second drive train being arranged to override the primary deadbolt mechanism so as to drive the bolt members from the extended to the retracted configuration even when the primary deadbolt mechanism is in the locked state; and a secondary deadbolt mechanism arranged to prevent the bolt members from being driven from the extended to the retracted configuration when the secondary deadbolt mechanism is in a locked state, the secondary deadbolt mechanism comprising a fail-safe electrical actuator that ceases to prevent the bolt members from being driven from the extended to the retracted configuration in case of electrical power loss to the bolting mechanism.

2. The bolting mechanism of claim 1 wherein the first drive train is arranged to receive motion from a said first handle disposed on a first side of the bolting mechanism, and the second drive train is arranged to receive motion from a said second handle disposed on a second side of the bolting mechanism opposite to said first side of the bolting mechanism.

3. The bolting mechanism of claim 1 wherein the bolting mechanism is configured to secure a leaf within a frame to restrict access between an outside space on one side of the leaf and an inside space on the other side of the leaf, the first drive train being arranged to couple motion of a said first handle which is disposed in the outside space, the second drive train being arranged to couple motion of a said second handle which is disposed in the inside space.

4. The bolting mechanism of claim 1 wherein the primary deadbolt mechanism comprises a first deadbolt arranged to engage at least one 10 of the bolt members, the fail-secure electrical actuator comprising a solenoid arranged to retract the second deadbolt from engagement with the said at least one of the bolt members when powered.

5. The bolting mechanism of claim 4 wherein the secondary deadbolt mechanism comprises a second deadbolt arranged to engage with at least one of the bolt members, the fail-safe electrical actuator comprising a solenoid arranged to drive the deadbolt into engagement with the said at least one of the bolt members when powered.

6. The bolting mechanism of claim 5 wherein the primary and secondary deadbolt mechanisms are arranged to engage with first and second ones of the bolt members respectively, to prevent the bolt members from being driven from the extended to the retracted configuration, wherein the first and second bolt members are driven in opposite directions to each other between the extended configuration and the retracted configuration.

7. The bolting mechanism of claim 1 wherein the secondary deadbolt mechanism comprises a second deadbolt arranged to engage with at least one of the bolt members, the fail-safe electrical actuator comprising a solenoid arranged to drive the deadbolt into engagement with the said at least one of the bolt members when powered.

8. The bolting mechanism of claim 7 wherein the primary and secondary deadbolt mechanisms are arranged to engage with first and second ones of the bolt members respectively, to prevent the bolt members from being driven from the extended to the retracted configuration, wherein the first and second bolt members are driven in opposite directions to each other between the extended configuration and the retracted configuration.

9. The bolting mechanism of claim 1 wherein the second drive train implements a lost-motion mechanism which overrides the primary deadbolt mechanism before driving the bolt members from the extended to the retracted 30 configuration.

10. The bolting mechanism of claim 9 wherein the lost-motion mechanism comprises an override member which is arranged to move, in response to motion of the second handle, parallel to the motion of one of the bolt members which is adjacent to the primary deadbolt mechanism, the override member being arranged to urge a deadbolt of the primary deadbolt mechanism to disengage with the said bolt member.

11. The bolting mechanism of claim 9 wherein the first drive train comprises one or more first rotating gears, and the second drive train comprises one or more second rotating gears each of which is coaxial with one of the first rotating gears.

12. A bolting system comprising the bolting mechanism of claim 9 and a controller, the controller being arranged:

to maintain the bolting mechanism in a locked state with the bolt members in the extended configuration, by not electrically powering the fail-secure electrical actuator of the primary deadbolt mechanism and electrically powering the fail-safe electrical actuator of the secondary deadbolt mechanism; and to maintain the bolting mechanism in an unlocked state permitting the bolt members to be driven from the extended to the retracted configurations by electrically powering the fail-secure electrical actuator of the primary deadbolt mechanism and not electrically powering the fail-safe electrical actuator of the secondary deadbolt system.

13. A leaf within a frame comprising:

the bolting mechanism or system of claim 9, the leaf being arranged to restrict access between an outside space on one side of the leaf and an inside space on the other side of the leaf;

a said first handle disposed in the outside space and coupled to the first drive train; and drive train; and a said second handle disposed in the inside space and coupled to the second drive train.

14. The bolting mechanism of claim 1 wherein the primary deadbolt mechanism comprises a key cylinder into which a physical key can be inserted from the side of the bolting mechanism of the first handle and used to drive the key cylinder, the primary deadbolt mechanism being arranged such that the driving the key cylinder overrides the fail-secure actuator so as to permit the bolt members to be driven from the extended to the retracted configuration by the first handle even in the event of electrical power loss to the bolting mechanism.

15. A bolting system comprising the bolting mechanism of claim 1 and a controller, the controller being arranged:

to maintain the bolting mechanism in a locked state with the bolt members in the extended configuration, by not electrically powering the fail-secure electrical actuator of the primary deadbolt mechanism and electrically powering the fail-safe electrical actuator of the secondary deadbolt mechanism; and to maintain the bolting mechanism in an unlocked state permitting the bolt members to be driven from the extended to the retracted configurations by electrically powering the fail-secure electrical actuator of the primary deadbolt mechanism and not electrically powering the fail-safe electrical actuator of the secondary deadbolt system.

16. The bolting system of claim 15 wherein, if both the fail-secure electrical actuator of the primary deadbolt mechanism and the fail-safe electrical actuator of the secondary deadbolt system become unpowered, operation of the first handle is blocked from retracting the bolt members by the fail-secure nature of the first electrical actuator, but operation of the second handle is permitted to retract the bolt members by the fail-safe nature of the second electrical actuator.

17. A method of controlling the apparatus of claim 1 comprising:

maintaining the bolting mechanism in a locked state, in which the bolt members are extended, by not electrically powering the fail-secure electrical actuator of the primary deadbolt mechanism and by electrically powering the fail-safe electrical actuator of the secondary deadbolt system; and maintaining the bolting mechanism in an unlocked state, in which the bolt members can be driven from the extended to the retracted configuration, by electrically powering the fail-secure electrical actuator of the primary deadbolt mechanism and by not electrically powering the fail-safe electrical actuator of the secondary deadbolt system.

18. The method of claim 17 further comprising maintaining the bolting mechanism in an unpowered state in which neither the fail-secure electrical actuator of the primary deadbolt mechanism nor the fail-safe electrical actuator of the secondary deadbolt system are electrically powered.

19. The method of claim 18 further comprising, when the bolting mechanism is in the locked state or the unpowered state, operating the second handle to override the primary deadbolt mechanism and to drive the bolt members from the extended to the retracted configuration.

20. The method of claim 19 further comprising, when the bolting mechanism is in an unpowered state in which neither the fail-secure electrical actuator of the primary deadbolt mechanism nor the fail-safe electrical actuator of the secondary deadbolt system are powered, using a physical key in a key cylinder of the primary deadbolt mechanism to override the fail-secure actuator, and operating the first handle to drive the bolt members from the extended to the retracted configuration.

* * * * *